United States Patent [19]
Bersack et al.

[11] Patent Number: 5,136,664
[45] Date of Patent: Aug. 4, 1992

[54] PIXEL RENDERING

[76] Inventors: Bret B. Bersack, 96 Prospect St., Belmont, Mass. 02178; Abraham Mammen, 15 Coleman Rd., Arlington, Mass. 02174; John W. Poduska, Sr., 24 Edward Dr., Winchester, Mass. 01890

[21] Appl. No.: 159,376

[22] Filed: Feb. 23, 1988

[51] Int. Cl.$^5$ .............................................. G06K 9/36
[52] U.S. Cl. ........................................ 382/49; 382/27
[58] Field of Search ....................... 382/50, 44, 45, 30, 382/27, 22, 25, 24, 23, 49; 340/798, 799, 800

[56] References Cited

U.S. PATENT DOCUMENTS

| | | | |
|---|---|---|---|
| 3,234,513 | 2/1966 | Brust | 382/50 |
| 4,014,000 | 3/1977 | Uno et al. | 382/25 |
| 4,635,292 | 1/1987 | Mori et al. | 382/49 |
| 4,665,556 | 5/1987 | Fukushima et al. | 382/49 |
| 4,718,091 | 1/1988 | Kobayashi et al. | 382/49 |

OTHER PUBLICATIONS

Baskett et al., The 4D-MP Graphics Superworkstation: Computing+Graphics=40 MIPS+MFLOPS and 100,000 Lighted Polygons Per Second, IEEE, 1988, pp. 468-471.
Theoharis et al., Parallel Incremental Polygon Rendering on a SIMD Processor Array, International Conf. & Exhibition, Parallel Processing for Computer Vision and Display, University of Leeds, UK 12-15 Jan. 1988, vol. 2, pp. 1-10.
Poulton et al., Pixel-Planes: Bldg. a VLSI-Based Graphic System, 1985 Chapel Hill Conference on VLSI, pp. 35-60.
Fuchs et al., Fast Spheres, Shadows, Textures, Transparencies, and Image Enhancements in Pixel-Planes, San Francisco Jul. 22-26 1985 ACM 089791-16-6-0/85/007/0111, vol. 19 No. 3, Siggraph '85, pp. 111-120.
Levinthal et al., Chap-A SIMD Graphics Processor, Computer Graphics, vol. 18, No. 3, Jul. 1984, pp. 77-82.
Sproull et al., The 8 by 8 Display, ACM Transactions on Graphics, vol. 2, No. 1, Jan. 1983, pp. 32-56.
Bishop et al., Fast Phong Shading, Siggraph '86, ACM 0-89791-196-2/008/0103, pp. 103-106.
Bergman et al., Image Rendering by Adaptive Refinement, University of North Carolina at Chapel Hill, 9 pages. (no date).
Torborg, A Parallel Processor Architecture for Graphics Arithmetic Operations, Computer Graphics, vol. 21, No. 4, Jul. 1987, pp. 197-204.
Swanson et al., A Fast Shaded-Polygon Renderer, Siggraph '86, ACM 0-89791-196-2/86/0095, pp. 95-97, and 3.

Primary Examiner—Leo H. Boudreau

[57] ABSTRACT

A method for rendering pixels for an object to be displayed in an image, based on parameters defining the object, by generating, in parallel, pixel values for at least some pixels contained in the object, but fewer than all pixels in an image, and repeating that step until all pixels for the object have been rendered.

21 Claims, 10 Drawing Sheets

|  | X'−1 | X' | X'+1 | X'+2 |
|---|---|---|---|---|
| Y'−1 | Toe 0<br>$F-A-B$ | Toe 1<br>$F-B$ | Toe 2<br>$F+A-B$ | Toe 3<br>$F+2A-B$ |
| Y' | Toe 4<br>$F-A$ | Toe 5<br>$F$ | Toe 6<br>$F+A$ | Toe 7<br>$F+2A$ |
| Y'+1 | Toe 8<br>$F-A+B$ | Toe 9<br>$F+B$ | Toe 10<br>$F+A+B$ | Toe 11<br>$F+2A+B$ |
| Y'+2 | Toe 12<br>$F-A+2B$ | Toe 13<br>$F+2B$ | Toe 14<br>$F+A+2B$ | Toe 15<br>$F+2A+2B$ |

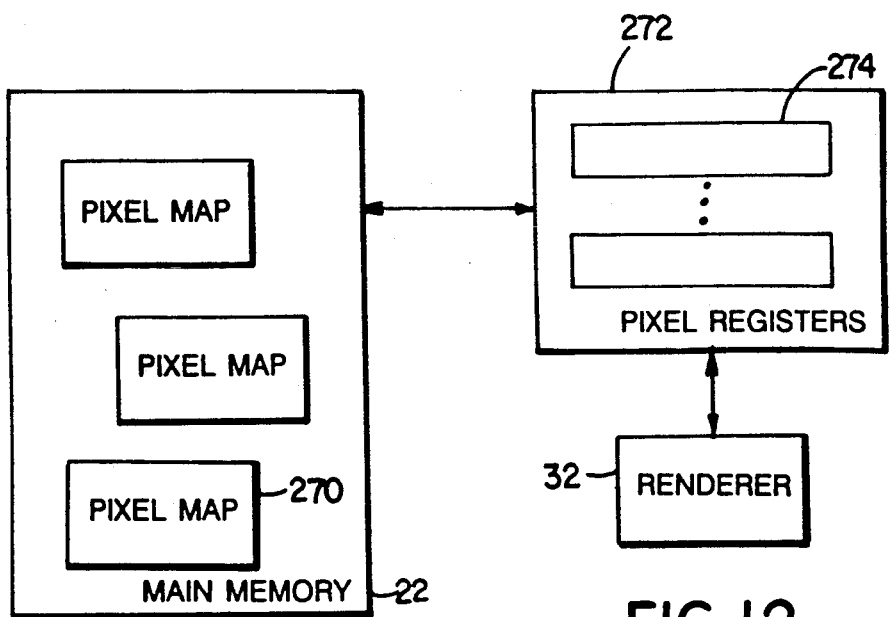
FIG. 12
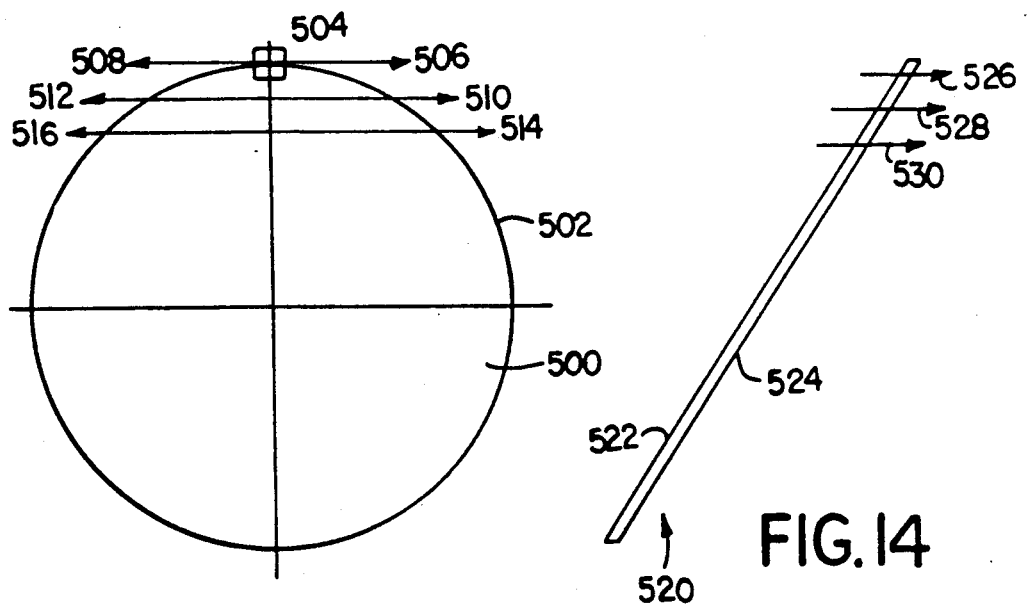
FIG. 13
FIG. 14

PIXEL RENDERING

BACKGROUND OF THE INVENTION

This invention relates to rendering pixels of an image for display.

The array of pixels that make up the image are represented by values stored in a pixel map and later retrieved to drive, e.g., a CRT. A typical image is built up as a montage of geometric objects of several basic types, for example, triangles, spheres, and lines. The size, shape, and orientation of each object is defined by a set of basic parameters (such as the location of the center of a circle and its radius) called a primitive. The process of converting the primitives of an image to pixel values in the pixel map is called rendering. In rendering each pixel, it must be determined which pixels lie within those objects, and what color value the pixel should have, given the information provided in the primitive for that object (e.g., its geometry and 3D/2D coordinates) and the shading and lighting to be applied.

In one known rendering technique, the plane of the image is divided into sub-planes. Each pixel of each plane has a simple processor dedicated to rendering that pixel. All of the simple processors render their pixels simultaneously in parallel.

In another approach, there are four rendering processors dedicated respectively to red, green, blue, and alpha channels.

SUMMARY OF THE INVENTION

One aspect of the invention features a method for rendering pixels for an object to be displayed in an image, based on parameters defining the object, by generating, in parallel, pixel values for at least some pixels contained in the object, but fewer than all pixels in an image, and repeating that step until all pixels for the object have been rendered.

Preferred embodiments of the invention include the following features. The pixels of the object are organized in an array of non-overlapping blocks, and in each iteration pixel values are generated only for pixels in one of the blocks. In successive iterations, succesive blocks of the array are traversed in an order based on determining which blocks contain pixels within the object being rendered. The array comprises rows and columns of said blocks and said blocks are traversed row-by-row. In each step, the pixels rendered lie within a rectangular block of the image.

For rendering a triangular object having three edges and three vertices defined by X and Y coordinates, the method includes choosing as the first block in which pixels are to be generated, a block in which one of the vertices lies, the block being chosen such that pixels of the objects may be rendered by traversing the array beginning at the first block and proceeding row by row such that the traversal along each row is always in the same direction and the traversal from each row to the next row is always in the same direction. The array of blocks is traversed by (i) rendering pixels in the first block, (ii) if the next block in the row after the first block includes a pixel contained in the triangle to be rendered, rendering pixels in that next block, (iii) repeating step (ii) until at least all blocks in the row that include a pixel contained in the triangle have been rendered, (iv) rendering pixels in the block in the next row beginning with the first block in the row that includes a pixel contained in the triangle, and (v) repeating steps (ii) through (iv) until the entire triangle has been rendered.

During the first step, the identity of the first block in the next row of blocks that includes a pixel contained in the triangle to be rendered is stored for use in step (iv). A determination is made whether a block includes a pixel contained in the triangle to be rendered by testing whether a pixel in an appropriate corner of the block is inside the triangle.

For rendering a spherical object lying on a center defined by X and Y coordinates, the method includes choosing as the first block in which pixels are to be generated a block containing a pixel that lies on the circumference of the sphere and on a radius of the sphere which lies along the X or Y axis. The array of blocks is traversed by rendering pixels in the first block, traversing blocks along a first row on either side of the first block until at least all blocks in the row that include a pixel contained in the sphere have been rendered, and repeating the second step in successive rows until the entire sphere has been rendered.

For rendering a line object, the method includes representing the line as two parallel edges, and traversing the two parallel edges in successive rows of blocks along the length of the line. The two parallel edges are one pixel apart.

Another general feature of the invention provides apparatus for rendering pixels for an object to be displayed as part of an image, including an array of processors for rendering, in parallel, respective pixels in corresponding arrays of pixels that are each smaller than the complete array of pixels in the image to be displayed, and a controller for directing the array of processors to work in sequence on a succession of arrays of pixels that include pixels contained in the object to be rendered.

Preferred embodiments of the invention include the following features. All processors in the array execute a common sequence of instructions. The sequence of instructions includes instructions that may be conditionally executed by a given processor, and routines that enable each processor to determine whether the pixel that it is assigned to render within an array of pixels is contained in the object to be rendered. The rendering is accomplished by calculating a value for each pixel based on a function that depends on the position of the pixel, one of the processors, having a predetermined position in the array, serves as a canonical processor and is assigned an initial value for the function, and each processor in the array calculates an initial value for its corresponding pixel based on the initial value for the canonical processor and on the position of the processor relative to the canonical processor. Microprogram instructions executable by each processor and capable of multiplying a value by 0, 1, −1, or −2 and adding another number to the result enable the initial values for the one processor to be calculated quickly. The array is 4×4 and the canonical processor is located at position 1,1. Each processor executes logical operations enabling the generation of a combined pixel write enable flag from several containment equations.

The invention enables rapid, efficient rendering of pixels, provides an efficient split of the computational effort of rendering between a vector processor and integer processors, handles a variety of graphics objects and is adaptable to handle a range of rendering functions, takes advantage of vector processing capabilities already present in the computer, and makes efficient use of a minimum complement of hardware.

Other advantages and features will become apparent from the following description of the preferred embodiment, and from the claims.

DESCRIPTION OF THE PREFERRED EMBODIMENT

We first briefly describe the drawings.

FIG. 5 is a chart of adjustment relationships for the toes of the renderer footprint.

FIG. 12 is a diagram of pixel maps and pixel registers.

FIGS. 13, 14 are diagrams of traversals of representative spheres and lines.

STRUCTURE

Figure 1:
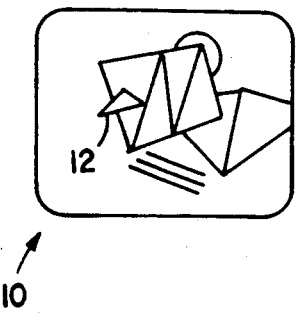
FIG. 1 is an image to be displayed.

Referring to FIG. 1, an image 10 to be displayed includes a number of objects, including lines, triangles (e.g., triangle 12), and spheres.

Figure 2:
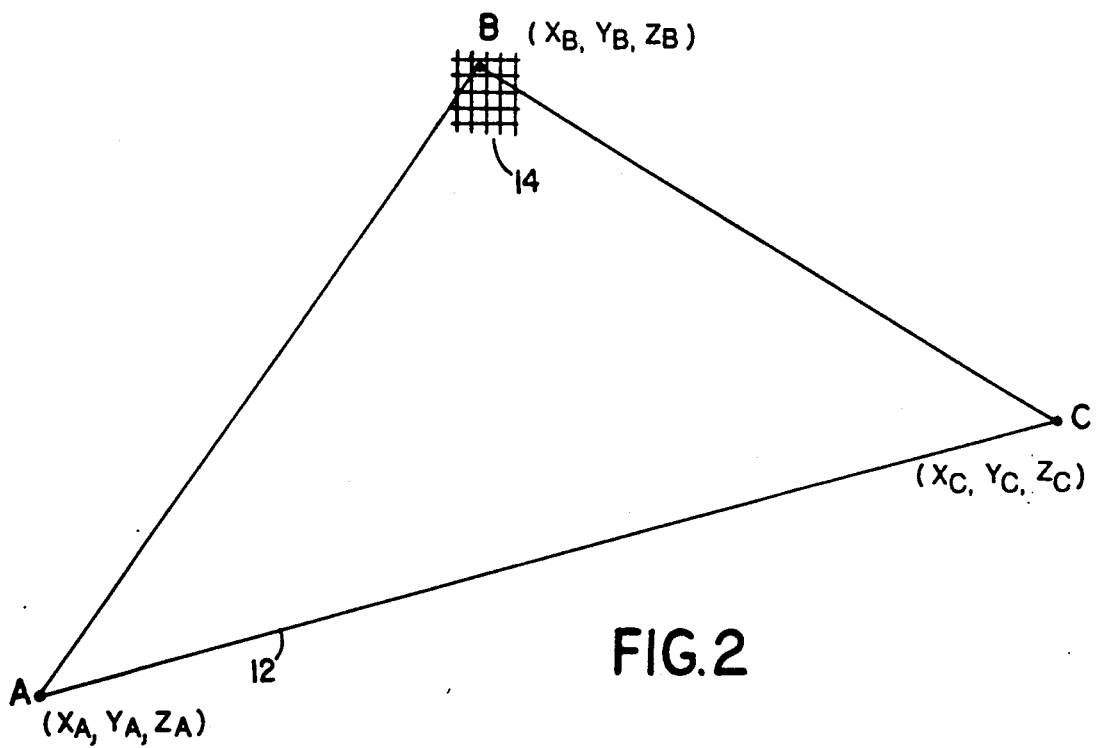
FIG. 2 is an example of an object of a particular geometry in the image.

Referring to FIG. 2, the primitive for triangle 12 includes the x,y, and z coordinates of its three vertices, A, B, and C (which together define its shape, size, and orientation relative to the image plane), a color value, v, specifying the color at each vertex, and possibly other display attributes, for example, attributes applicable to the edges (e.g., the area coverage per edge), or to the entire triangle or facet (e.g., shading, transparency, anti-aliasing represented by linear or second order functions of x and y). A portion of the pixel array 14 of the image is shown in the vicinity of vertex B.

The primitive for the triangle must be converted to a set of pixel values, each representing the display color for one of the pixels that lies within the boundaries of the triangle. The color value for a given pixel depends (generally based on first order linear equations but in some cases second-order equations) on the color values of the vertices of the triangle, and on the shading and lighting that are to be imparted to the triangle for display.

Figure 3:
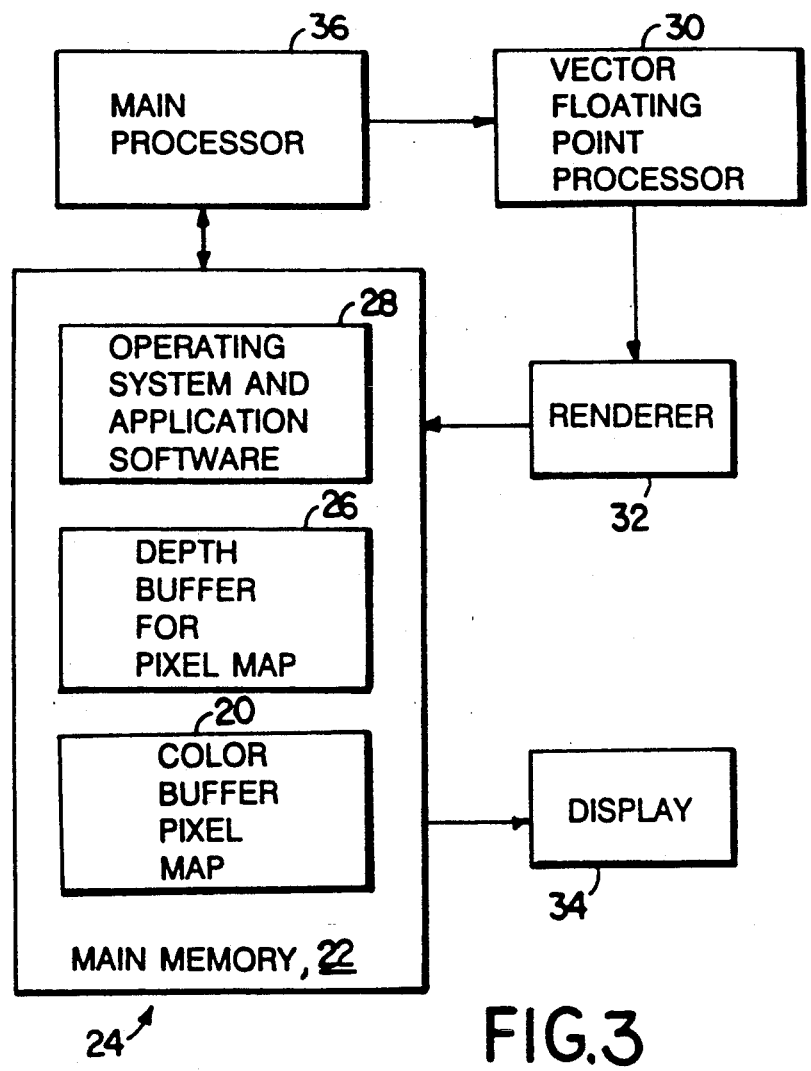
FIG. 3 is a block diagram of a graphics sub-system.

Referring to FIG. 3, the rendered pixel values of the entire image are stored in a color buffer pixel map 20 in the main memory 22 of a computer graphics sub-system 24. In rendering true color pixels, a separate depth buffer 26 stores the z coordinates (i.e., the depth relative to the image plane) of the corresponding pixel values in pixel map 20. In rendering pixels on a pseudo color basis, a single pixel map buffer stores both 16 bits of color value and 16 bits of z value. The information in buffer 26 is useful in determining whether a pixel of an object being rendered overlays a pixel of an object previously rendered. The addressing scheme used for a pixel map is such that the address for a given pixel reflects the relative position of the pixel in the image.

A main processor 36, under control of operating system and application software 28 (stored in main memory 22) determines which objects need to appear in the image, and generates a list of corresponding primitives.

A vector floating point processor 30 receives each primitive and (i) scales, rotates, and translates (i.e., transforms) the coordinates of the primitive in accordance with the specified size, orientation, and position of the object in the image, (ii) clips the vertices and edges of the primitive to eliminate portions that are not within the field of view of the image, (iii) computes shading and lighting equations related to appearance of the object, (iv) delivers the transformed, clipped coordinates of the primitive (e.g., vertices in the case of a triangle) to a renderer 32, and (v) delivers rendering commands to the renderer. The renderer buffers arguments sent from the vector unit in conjunction with "vector send to renderer" commands, but does not begin to render the object until, after all arguments have been buffered, it receives a "renderer execute" command.

Renderer 32 converts each primitive to pixel values and z values (using algorithms that perform scan conversion, hidden line and surface removal, shading, lighting, and anti-aliasing) and stores the values in the pixel map and depth buffer. The image may then be displayed on a display 34 which scans the image from the pixel map, maps the pixels through a pseudo-color or true-color lookup table, and displays them on a high resolution (1280×1024 pixels) color monitor.

Figure 4:
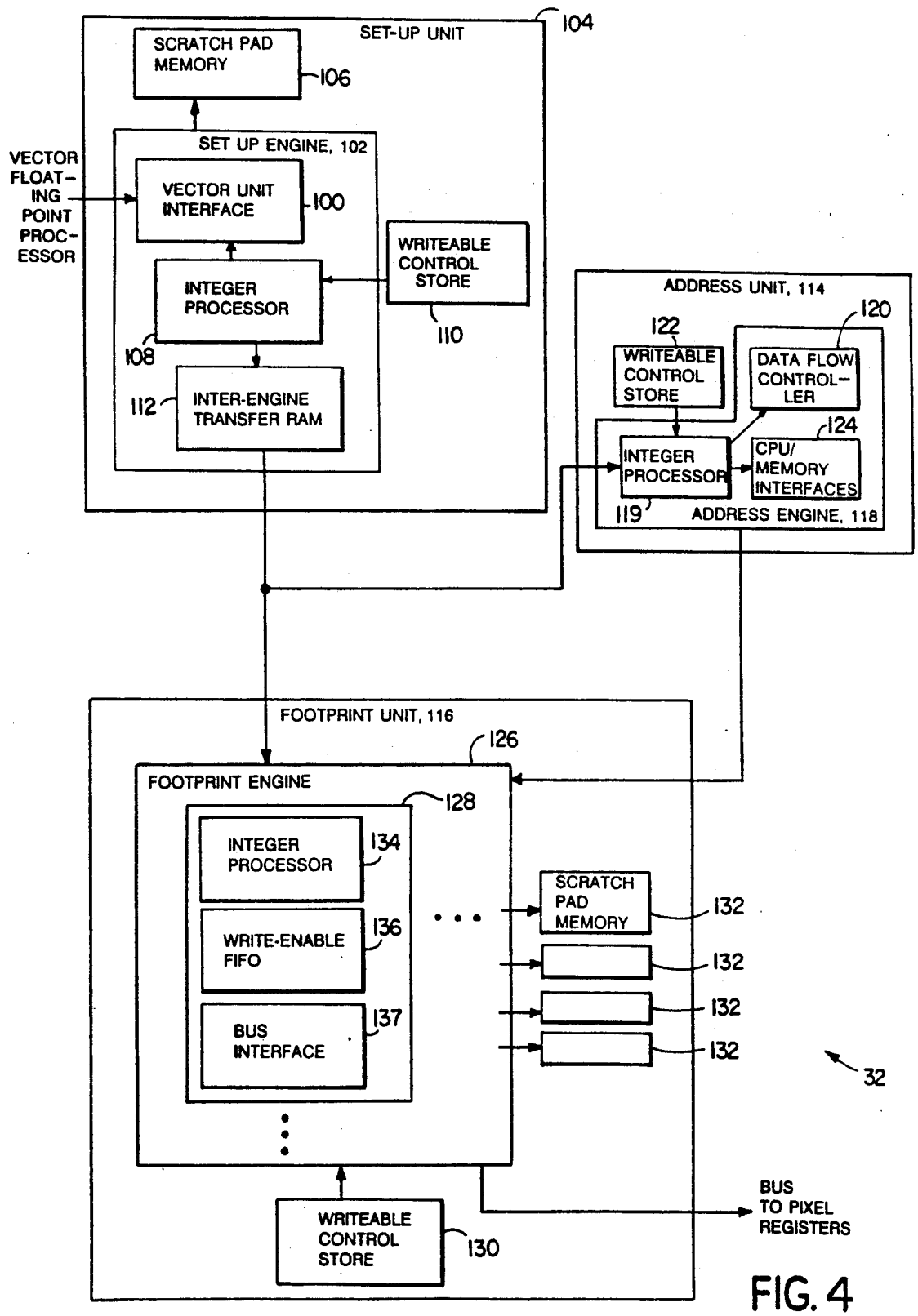
FIG. 4 is a block diagram of a renderer.

Referring to FIG. 4, in renderer 32, the commands and object parameters (the primitive) from the vector floating point processor are received in a vector unit interface 100 which is part of a set-up engine 102 in a set-up unit 104. Interface 100 connects the set-up engine to the vector processor as a slave device. As mentioned, the received commands and parameters are stored temporarily in a scratchpad memory 106 in set-up unit 104. An integer processor 108 in set-up engine 102 decodes the commands (using microcode instructions stored in a writeable control store 110) and (as explained in more detail below) performs initialization and preliminary calculations on the vertex coordinates and color values to determine the coefficients and starting values for the linear rendering equations to be used for the particular object being rendered. The computed values are transferred (via an inter-engine transfer RAM 112) to an address unit 114 and a footprint unit 116, which are also part of renderer 32. The inter-engine transfer RAM allows transfers to occur while the setup processor is free to continue normal execution, with access to scratchpad memory 106 (because the transfer RAM buses are separate from the scratchpad memory buses). This enables the renderer "pipeline" to be kept busy on a fairly continuous basis, to achieve high rates for rendering lines and triangles.

The setup engine 102 is an application specific integrated circuit (ASIC). Writeable control store 110 is a high-speed 16 K-word by 64-bit RAM loaded at system boot time and inaccessible to the user. Scratchpad memory 106 is a high-speed 16 K-work by 32-bit RAM which buffers send and receive data from the vector unit interface 100, and stores arguments under microcode control. Memory 106 is also used when the internal 32 deep register file is insufficient to complete execution of the primitive.

Address unit 114 includes an address engine 118 (an ASIC) having an integer processor 119 which (in accordance with microcoded instructions in a writeable control store 122) evaluates functions that define the boundaries of the object to be rendered, determines the addresses of blocks of pixels for which pixel values need to be calculated, maintains (in a data flow controller 120) a queue of addresses of pixel map blocks to be traversed in the course of rendering, and coordinates (also in data flow controller 120) memory requests for pixel map blocks with the operation of the footprint engine 116.

Data flow controller 120 buffers and coordinates main memory requests with the operation of the footprint. It maintains pointers that keep track of a 16 deep queue of pending memory requests and footprint operations. Each active entry in the queue is assigned a pixel register 274 (shown in FIG. 9 and discussed below). A queue entry includes a main memory logical address (pointing to the first—i.e., upper left corner—pixel of a block of memory), a footprint microprogram jump address (pointing to where the footprint processors should begin execution of their code), and four bits of control information. Queue entries are generated sequentially by the address engine and, for pixel operations that are read/write in nature, are processed in three stages: main memory read, footprint execute, and main memory write. Each stage processes the entries in sequential order.

A queue entry enters the first stage (main memory read) immediately after it is generated by the address engine. If a memory read cycle is being requested, pixel values for the pixels in the block are transferred fom the main memory into the pixel register. The address processor invokes execution of the appropriate sequence by the toes only when the requested read data has become available in the pixel register. In the second stage, footprint execution is begun simultaneously by all of the toes at the jump address. In the third stage, the pixel values are written back into main memory via the pixel register. When the queue entry is completed, the queue location becomes available again. The queues are implemented in a 32-deep register file which allows the address processor to stack up more than eight memory requests at a time, although at any moment, the data flow control only sees an active window of the queue that is 8 deep. The moving window feature allows the address microcode to keep the renderer "pipeline" busy for cases that require multiple memory references (e.g., true color rendering with z buffering), or multiple toe execution sequences per pixel (normal shading).

Address engine 118 also includes a cpu/memory interface 124. Writeable control store 122 is a high-speed 16 K-word by 64-bit RAM, loaded at boot time.

Footprint unit 116 determines which of the sixteen pixels in a pixel map memory block are part of the object to be rendered (using a containment algorithm), and calculates in parallel the pixel values and the z values for all sixteen pixels, including the contained pixels. Only the values for the contained pixels are loaded into the pixel map and depth buffer. All sixteen pixel color and z values are written back to the pixel registers, but write enable signals from each toe (defined below) can disable writing of its pixel value from the registers back to the pixel map in main memory, for pixels that are not contained in the object.

In footprint unit 116, a footprint engine 126 includes a 4×4 array (called a footprint) of identical footprint engines (ASICs) 128 (called toes). The toes are organized in a single-instruction, multiple-data architecture in which they simultaneously in parallel execute the same microcoded instructions stored at boot time in a high-speed 16 K-word by 64-bit writeable control store RAM 130, with each toe generating the pixel value and z value for only one of the pixels in an array of sixteen pixel values stored in a block of the pixel map in memory. As explained below, some degree of conditional execution is permitted in each toe to achieve data-dependent execution.

The sixteen toes are organized in four groups of four toes each, each group being served by a high-speed 16 K-word by 32-bit scratchpad memory RAM 132. Within each toe is an integer processor 134, a write-enable fifo buffer 136 to buffer the write enable signals, and a bus interface 137 for communication over the bus to the pixel registers.

The integer processors in all of the ASICs used in the renderer share the following features in common: a 32×32 general purpose, dual ported register file, a 32-bit ALU with priority encoder and barrel shifter, a 16×16 integer multiplier with multiplier shifter, an accumulator, a memory address register (for scratchpad memory accesses), an input data register, an output data register, condition code and special purpose flags, and miscellaneous status inputs.

The processors in the set-up, address, and footprint engines have a microcode instruction set that includes instructions specially designed to speed the rendering process. These include instructions that multiply by 0, 1, −1, and 2 and which add the result to another value all of which allow easy derivation of the value at any toe from the value at the canonical toe.

Some instructions in the microcode instruction set include a conditional execution field that indicates whether or not the instruction should be executed based on a condition code set up in a prior instruction. This permits, for example, different toes to execute different instructions for the pixels of a given block. For example, if some portion of the footprint microcode computes a saturation value for each pixel, but there is a maximum possible saturation value that may be displayed, then the code could include a conditional instruction to load the calculated saturation value into the pixel register if less than the maximum, followed by a conditional instruction to load the maximum saturation value if the calculated value exceeds the maximum.

Some instructions also include a special flag control field that operates in conjunction with a test condition selected by a condition select field. One of the special flags is generated as a composite containment flag indicative of when a given pixel is found to be contained in the object being rendered and satifies other conditions (e.g., an appropriate z value), which enables writing of the generated pixel value into the pixel map. Then any condition that is required to be met in order for a pixel value to be written into the pixel register could be combined in the composite flag.

Referring to FIG. 5, each toe 250 in the footprint 251 has a unit number 252 which reflects its position relative to the other toes. Toe 5, called the canonical toe, is located at position 1,1 (where 0,0 is the position of toe 0). If the address of the pixel map memory block where the footprint is working is called X,Y and points to toe 0, the address of the canonical toe can be called X',Y', where X'=X+1, and Y'=Y+1. Then, for any first order function $f=Ax'+By'+c$, if the value of f is F=c at toe 5, its value at each of the other toes is as shown.

For example, the value at toe 14 would be $Ax'+By'+F=A+2B+F$, because $X'=1$, $Y'=2$ represent the X and Y coordinates of toe 14 relative to toe 5 (adjacent toes have unit spacing along the X and Y directions). Note that the only operations needed to calculate f at all of the other toes are multiplication by 0, 1, −1, or 2, and accumulation.

OPERATION

Figure 6:
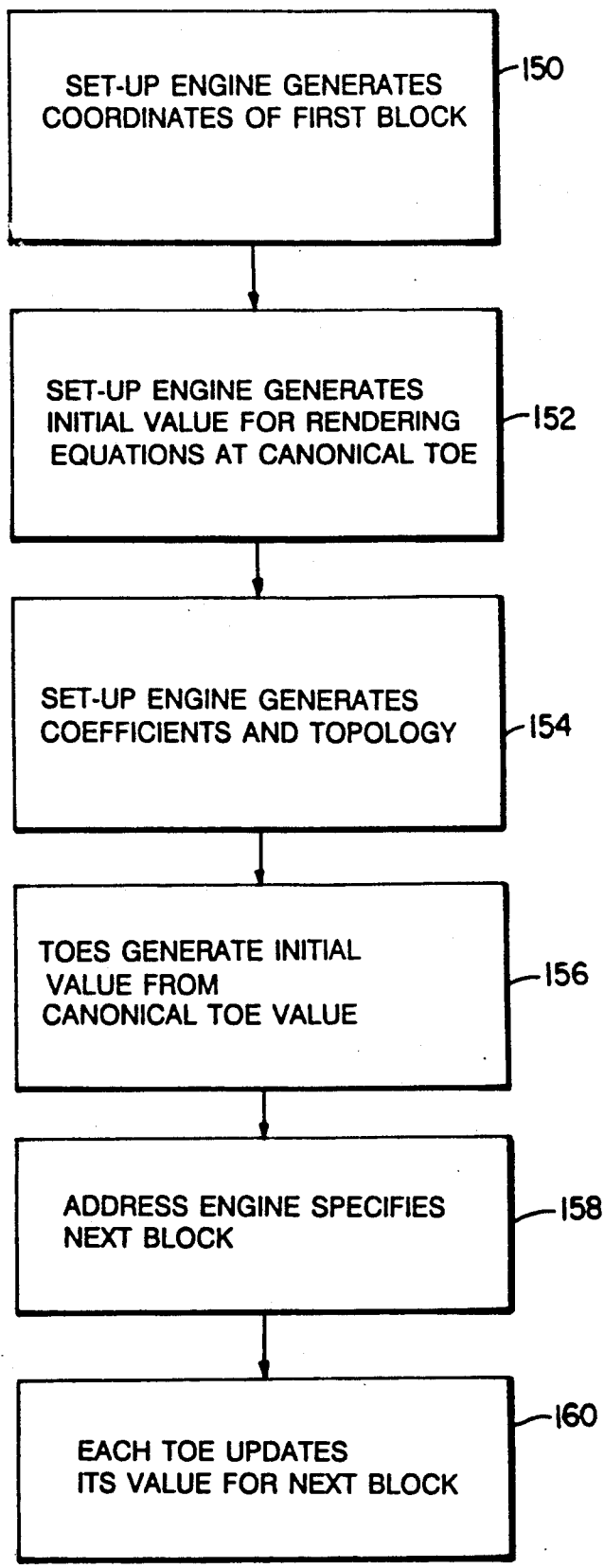
FIG. 6 is a flowchart of the rendering process.

Referring to FIG. 6, in general, in rendering an object, the set-up engine (a) generates (150) the coordinates of the first pixel map memory block to be rendered, (b) generates the initial values (152) for the rendering equations at the canonical toe, including the containment equations, the z-value and pixel color interpolation equations, and lighting equations, based on the values at some known pixel within the first block, and (c) generates (154) information about the coefficients of the rendering equations and the topology of the object (described below) for use by the address and footprint processors. The initial value is generated by the set-up engine using quick multiply instructions which multiply a 32-bit number by a 2-bit pixel offset (1, 0, −1, or −2) in one cycle and possibly add another value. For example, if Is is the color value at the known pixel with the block, then the color value at the canonical toe $(I_c = I_s + \Delta x(\partial I/\partial X) + \Delta Y(\partial I/\partial Y)$. $\Delta X$ and $\Delta Y$ are, of course, in the set $[-2, -1, 0, 1]$.

Figure 7:
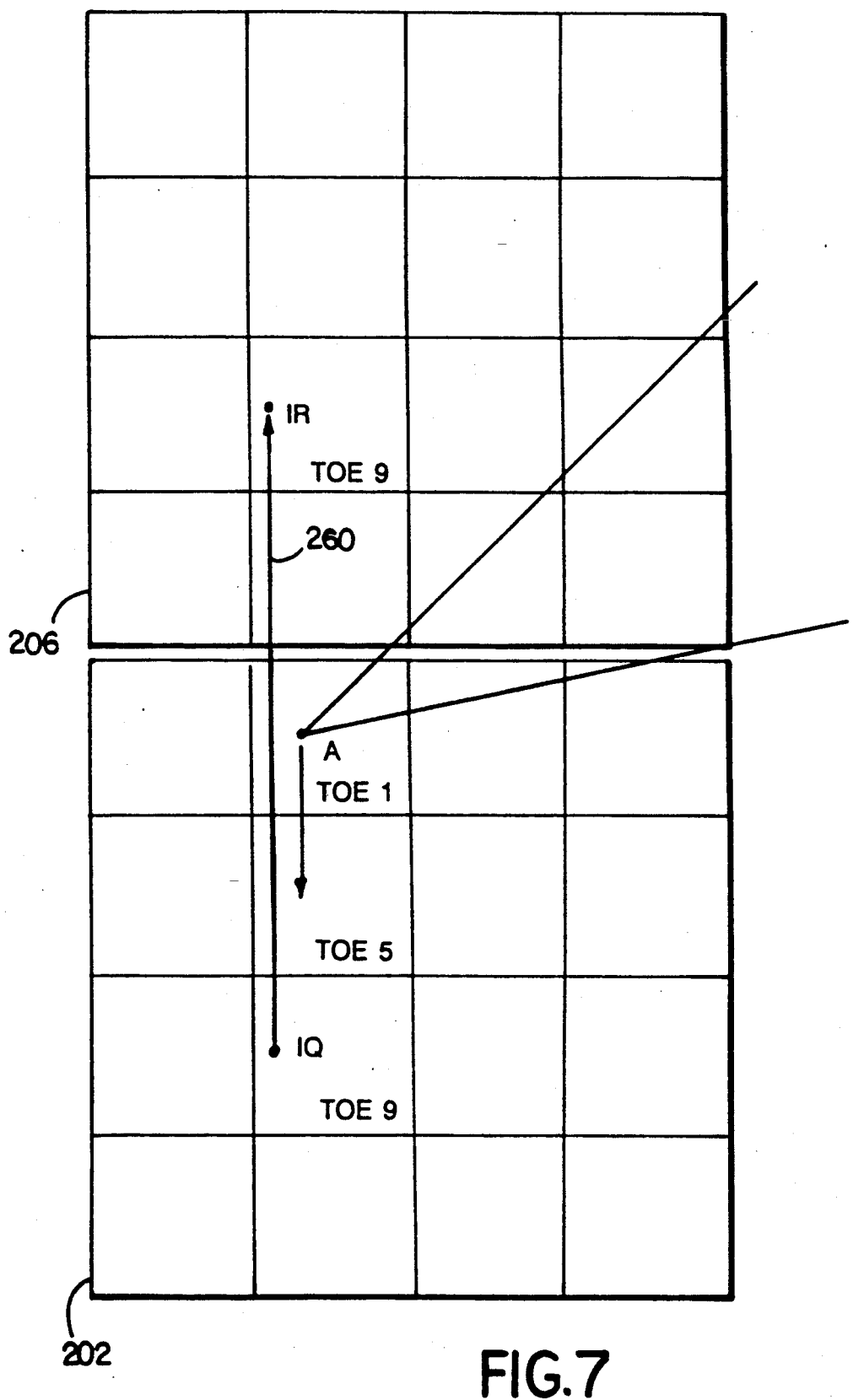
FIG. 7 is a diagram illustrating the shifting of toes as a result of moving from one pixel map memory block to another.

Referring to FIG. 7, for example, suppose that vertex A of triangle 12 of FIG. 2 has coordinates that place it in the domain of toe 1 of the footprint for the first pixel map memory block 202 to be rendered. The set-up engine converts the pixel color $I_s$ at toe 1 to the corresponding pixel value $I_c$ at the canonical toe 5 based on the linear rendering equations and the x,y coordinate relationships between toe 1 and toe 5. The set-up engine then sends the initial value $I_c$ to all of the toes of the footprint, which then calculate and store their own initial pixel values from the canonical value using the same equations. The set-up engine also generates and sends to the footprint the coefficients $A_1$, $A_2$, $A_3$, $B_1$, $B_2$, $B_3$, $C_1$, $C_2$, and $C_3$, required by the containment algorithm (described below), and the coefficients $A_z$, $B_z$ needed for z value interpolation, and $A_i$, $B_i$ needed for the i interpolation, and Taylor's series coefficients (second-order equations) to do per pixel dot product calculations, in cases where the shading mode is 'normal interpolated', such that the lighting calculations are done within the rendering unit.

The set-up engine then proceeds to the next primitive received from the vector processor, while the address and footprint engines are working on other primitives.

Referring also again to FIG. 6, once each toe generates (156) its initial pixel value for the current set of equations based on the canonical toe value, the address engine tells the toes which block is the next to be rendered (158). Each toe then updates and stores its value (160) by a simple computation that advances from its prior value by some multiple of the incremental X or Y value, depending on whether the current block is displaced from the prior one in the X direction or the Y direction.

For example, referring again to FIG. 7, if block 206 is the next one to be rendered after block 202, then, as indicated by line 260, the pixel value at to 9 of block 202 ($I_q$) is updated by adding $\Delta Y(\partial I/\partial Y) = +4(\partial I/\partial Y)$ to get the value $I_R$ at toe 9 of block 206.

As mentioned, the particular block of memory in which the footprint is working at a given time is determined by the address unit and specified to the toes. The address unit causes the footprint to traverse (walk) a series of blocks of the pixel map which provides for efficient rendering given the shape, size, and orientation of the object being rendered. At each block position of the footprint, each toe calculates the values for its pixel.

Figure 8:
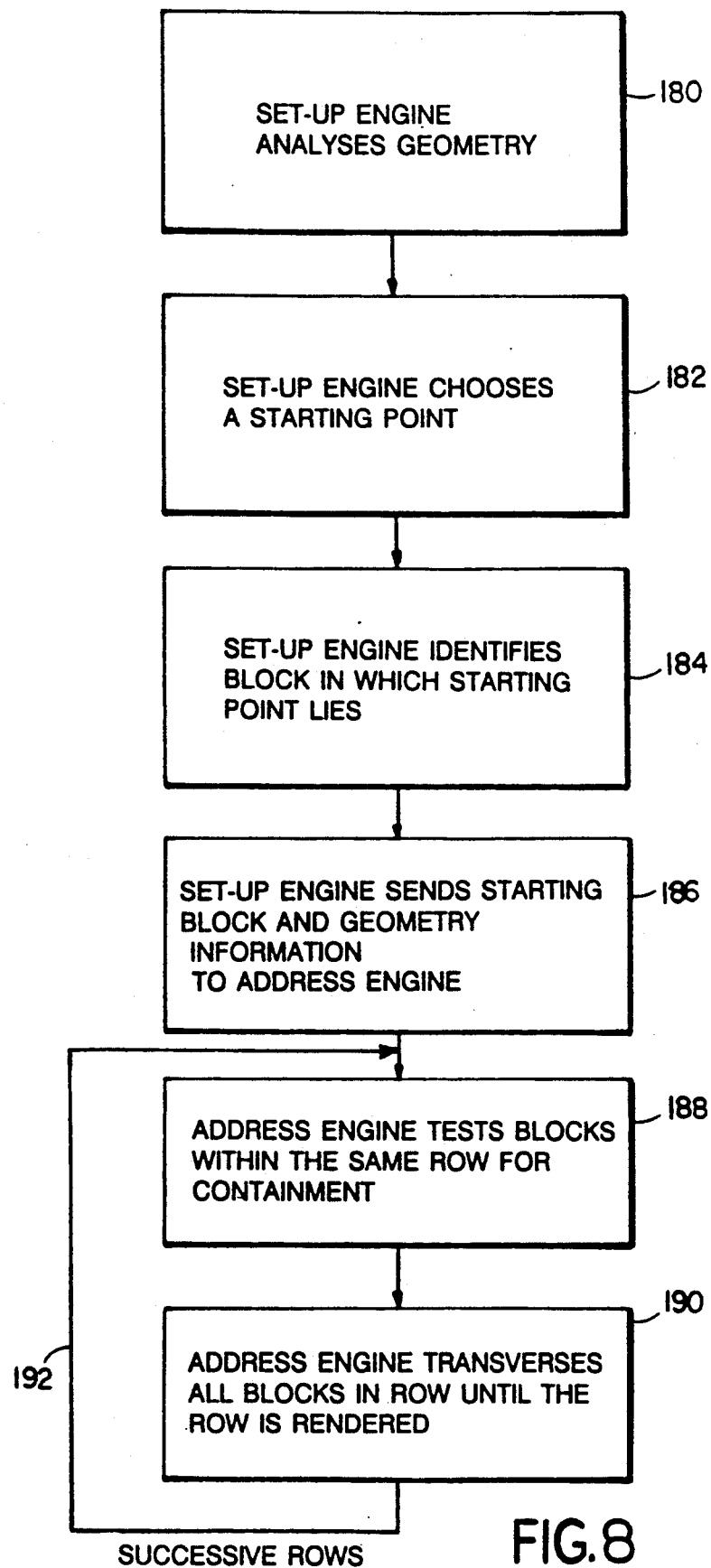
FIGS. 8, 9 are a flowchart and diagram, respectively, illustrating the scanning of a triangle by the renderer.

Referring to FIG. 8, in determining the sequence of blocks to be traversed, the set-up engine analyses the geometry (180), chooses a starting point (182) on the boundary of the object indentifies the block (184) in which the starting point lies, and sends (186) the starting block address and the geometry information to the address engine.

Based on the starting block and geometry information, the address engine tests blocks (188) within the same row to see if they contain pixels that lie in the object, and traverses a sequence of those blocks (190) until the row is fully rendered. The address engine repeats (192) the procedure for successive rows until the entire object is rendered.

Figure 9:
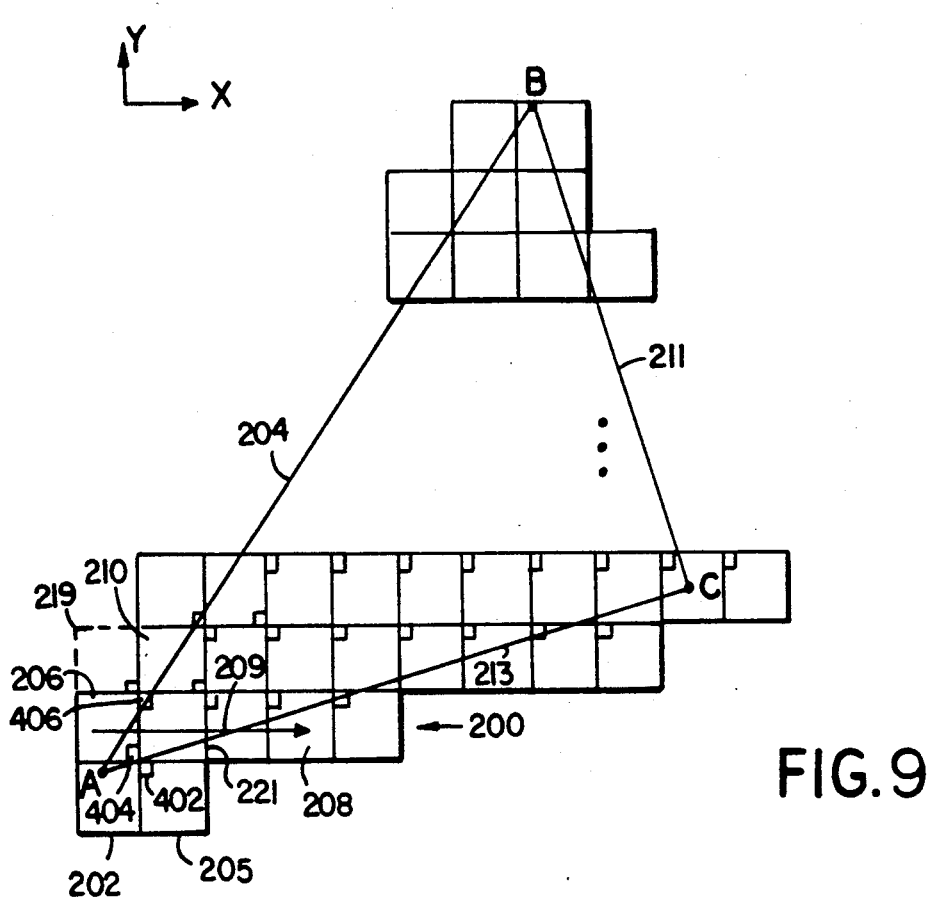

Referring to FIG. 9, in rendering a triangle, for example, the footprint traverses successive rows, e.g., row 200, of pixel map memory blocks 202 each having 4×4 pixels. The blocks are arranged in the image in an array of rows and columns; their positions relative to the triangle are determined by the intended location of the triangle in the image.

To find the first block of a triangle to be rendered, the set-up engine analyses the geometry of the triangle and classifies in one of several possible classes based on its shape and orientation. Then, based on the class in which it falls, the first block is the one which contains one of the triangle vertices and will (1) lead to a simple traversal scheme for traversing the blocks containing pixels of the triangle, and (2) require a minimum number of registers to be saved and stored.

Figure 10A:
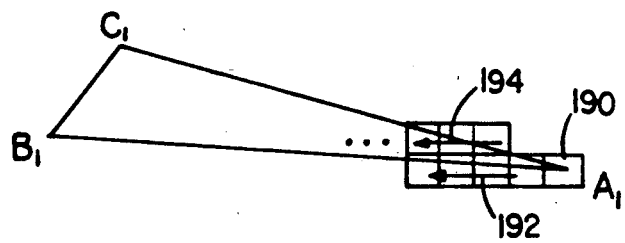
FIGS. 10A, 10B, 10C are illustrations of representative triangle geometries.
Figure 10B:
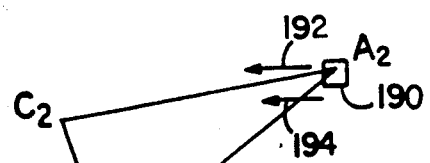
Figure 10C:
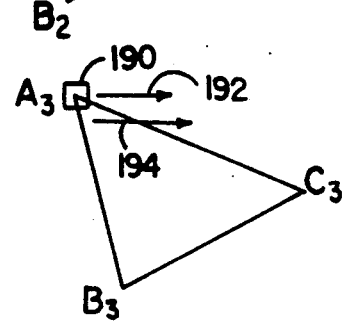
Figure 11:
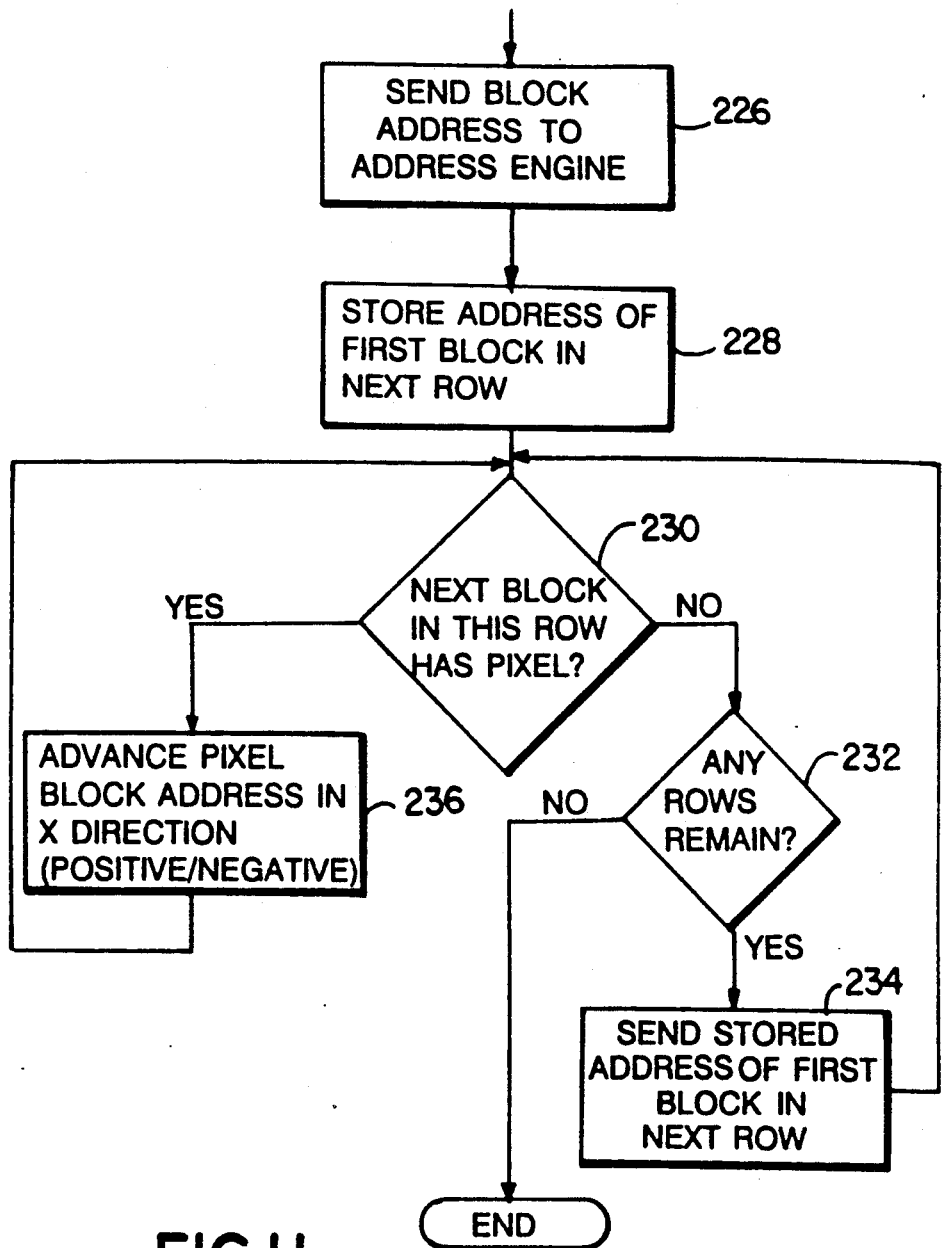
FIG. 11 is a flowchart of the generation of a block traversal sequence.

Referring to FIGS. 10A, 10B, 10C, in three different classes of triangle, traversal starts at the starting blocks 190 and follows the successive traversal paths 192, 194, and so on. In each case the traversal paths are simple in that they are all in the same direction and the successive paths lie in order one after the other. The same advantages apply to the traversal paths in FIG. 9.

More specifically, referring again to FIG. 9, with edge 204 denoted the major (longest) edge and edges 211, 213 denoted the minor edges, the traversal sequence begins at the major edge and the first scan line is in the x-direction to block 205 that is completely beyond the minor edge 213. While a given row is being scanned, the address engine is locating the first block of the next row. It does this by preadvancing the coefficients for major edge 204 (i.e., in function $f_1$) by one scan block in the Y direction. For example, while row 200 is being rendered, the address engine notes that block 219 (just above block 206) is wholly outside the triangle (which is easily detected because $f_1$—the containment equation for edge 204—is negative. When the second block 221 in row 200 is being scanned, block 210 is found to be intersected by edge 204. The address engine stores the instantaneous values of the functions for block 221 (i.e., for its upper left corner pixel) so that upon completing row 200, the instantaneous value of all equations at block 221 may be quickly used to advance one scan line up to block 210 to begin the next row. Address unit sends (226) the address of block 202 to memory and stores (228) the address of the first block 206 in the next row 200. As block 202 is being processed by the footprint, the address unit is looking (210) at the next block 205 in the same row to see if (230) any pixels within it are contained in the triangle, in the manner described below. In the case illustrated none do, so (assuming that any unprocessed rows remain - 232) the next block address sent (234) to the footprint is block 206, followed by the other blocks in the same row through block 208 (as indicated by arrow 209, FIG. 9). Then scanning continues (236) through the row beginning at block 210 and so on, row by row, until the entire triangle has been scanned.

As previously explained, when the scanning process leads from one block to another, the toes can easily perform their calculations. In the case of a move to a new block in the same row, this simply requires a computation based on a change in the x value of four units (because each toe position has moved four units in the x direction). For a row change, each toe has moved four units in the y direction and may also have moved some multiple of four units in the x direction, but the computation remains relatively simple.

In FIG. 7, for example, a move from block 202 to block 206 shifts the position of each toe by four units in the y direction.

Referring again to FIG. 9, the address unit must determine, for each possible block to be traversed, whether the block contains a pixel of the object to be rendered. It does so by examining one of the corner pixels of the block to see if it is contained in the object. Which corner pixel it examines depends on the class to which the triangle belongs; the address engine uses the topology information sent from the set-up engine for this purpose. In the triangle of FIG. 9, the address engine examines appropriate corners of the blocks to determine whether there is containment. The choice of which corner is tested is determined for each edge based on the topology and that same corner is always used with respect to that edge. For example the lower right-hand corner would always be tested with respect and edge 204 and the upper left hand corner with respect to edge 211.

With respect to its pixel, each toe in the footprint (i) determines if the pixel is contained in the object being rendered, (ii) if so, determines the pixel value and depth value, and (iii) in cases where z buffering routines are being used, if the depth value exceeds the present depth value for that pixel, substitutes the new pixel value for the old one, otherwise not.

Thus containment is determined both by the address engine in selecting the blocks to traverse and by the toes in determining whether they are operating on pixels within the object. In the case of a triangle, for example, the containment determination uses a set of three linear equations based on the coordinates of the vertices of the triangle and the coordinates of the pixel in question. Specifically, the three equations are $$f_i = A_i x + B_i y + c_i, \text{ for } i = 1, 2, 3,$$

where the As, Bs, and Cs are coefficients based on the coordinates of the vertices of the triangle as follows:

$$A_1 = y_1 - y_2; A_2 = y_2 - y_3; A_3 = y_3 - y_1;$$

$$B_1 = x_2 - x_1; B_2 = x_3 - x_2; B_3 = x_1 - x_3;$$

$$C_1 = x_1 \cdot y_2 - y_1 \cdot x_2; C_2 = x_2 \cdot y_3 - y_2 \cdot x_3;$$

-continued $$C_3 = x_3 \cdot y_1 - y_3 \cdot x_1.$$

Provided that the vertices are taken in the proper order, a pixel at location x,y lies within the triangle if the $f_i$ are all positive. Given an initial value for the $f_i = c_i$ which may be calculated by the set-up engine, all further calculations of $f_i$ for a particular pixel location may be determined by the toes incrementally based on the incremental changes in x and y compared to the values of x and y that pertained for the initial computation of $c_i$.

Similarly, calculations of the color values (i) and depth values (z) are based on the following linear equations $$z(x,y) - z_1 = A_z(x - x_1) + B_z(y - y_1);$$

$$i(x,y) - i_1 = A_i(x - x_1) + B_i(y - y_1),$$

where $A_z = ((z_2 - z_1)(y_3 - y_1) - (z_3 - z_1)(y_2 - y_1))/C;$
$B_z = ((z_3 - z_1)(x_3 - x_1) - (z_2 - z_1)(x_2 - x_1))/C;$
$A_i = ((i_2 - i_1)(y_3 - y_1) - (i_3 - i_1)(y_2 - y_1))/C;$
$B_i = ((i_3 - i_1)(x_3 - x_1) - (i_2 - i_1)(x_2 - x_1))/C;$
$C = (x_2 - x_1)(y_3 - y_1) - (x_3 - x_1)(y_2 - y_1).$ As the address engine specifies successive blocks for processing, it generates incremental x and y values from which the toes can easily generate their respective z and i values incrementally.

Normal interpolation equations are the final form for all other cases of shading and lighting involving surface normals, surface to eye vectors, and surface to light vectors. The normal interpolation equations are specified individually for the diffused and specular components and are second order equations that are linearized using forward differencing.

Referring to FIG. 13, the traversal pattern for a sphere 500 begins on the circumference 502 of the corresponding circle in the block 504 containing a particular one of the points where a diameter parallel to the Y axis intersects the circumference. In successive scan rows scanning begins at the Y axis, moves right until the right boundary is passed, then left until left boundary is passed. Thus the traversal sequence is represented by arrows 506, 508, 510, 512, 514, 516 in that order.

Referring to FIG. 14, a line 520 is traversed by treating it as a very narrow parallelogram with two parallel edge boundaries 522, 524 spaced one pixel apart. The traversal sequence is indicated by the order of arrows 526, 528, 530.

The overall intensity at a pixel is computed, for normal shading, based on (i) the specified surface color multiplied by an expression based on ambient coefficient of reflection, the ambient light intensity, the diffused coefficient of reflection, the diffused light intensity, the light vector and the normal vector, and (ii) the desired specular high-light color times an expression based on the specular coefficent of reflection, the diffused light intensity, the high-light vector and the normal vector. For a true color display there will be three calculations, one for each of red, green, and blue. The entire lighting model is applied at the vertices to derive a color and performed at the vector unit level. At the rendering unit level there is no knowledge of surface normals, light and eye vectors. Interpolation is done at the rendering unit level.

The scheme described above splits the rendering computations between portions requiring high precision and broad range which are performed at the vector floating point processor, and other portions that can be performed on an integer basis in the renderer.

Referring to FIG. 12, main memory 22 may contain multiple pixel maps 270, each rectangular and each having a width that is a multiple of 4 pixels. Each pixel value may include an arbitrary number of fields (e.g., color value, depth, alpha) but the total number of bits must be a multiple of 32. Each memory cycle can access sixteen 32-bit pixels via a set 272 of eight pixel registers 274, each having a capacity for sixteen 32-bit pixels. Pixel values are passed between renderer 32 and main memory 22 via the pixel registers. The pixels in a pixel map are addressable in a rectangular format in which a 4×4 block of pixels (corresponding to the footprint) are accessed by specifying the address of the toe 0 pixel (i.e., the address x,y in FIG. 5).

Rendering is performed on successive primitives that make up an image in an overlapped manner to provide maximum throughput. For example, when the memory system is transferring the rendered pixels of triangle I to virtual memory from the pixel register, the footprint is calculating pixel values for triangle II, the address engine may be determining the memory addresses for pixel map memory blocks for triangle III, the set-up engine may be calculating initial values and coefficients for the first block of triangle IV, and the vector unit may be transforming the vertices of triangle V.

Other embodiments are within the following claims. For example, other basic object types and shading modes may also be implemented, including those requiring evaluation of higher-order (e.g., higher than second order) equations.

We claim:

1. A method for rendering and displaying pixels for an object to be displayed in an image, comprising
   (a) providing parameters defining said object,
   (b) selecting at least some pixels contained in said object, but fewer than all pixels in said image,
   (c) assigning each processor in an array of processors to one of said selected pixels,
   (d) causing said processor to generate, in parallel, pixel values for said selected pixels based on said parameters,
   (e) repeating steps (b), (c), and (d) until pixel values have been generated for all pixels for the object, and
   (f) displaying said rendered pixel values.

2. The method of claim 1 further comprising
   organizing the pixels of said object in an array of non-overlapping blocks, and
   in each repetition of step (b), selecting only pixels in one of said blocks.

3. The method of claim 2 further comprising
   in successive repetitions, traversing successive blocks of the array in an order based on determining which blocks contain pixles within the object being rendered.

4. The method of claim 3 wherein said array comprises rows and columns of said blocks and said blocks are traversed row-by-row.

5. The method of claim 1 wherein said selecting comprises selecting pixels that lie within a rectangular block of the image.

6. A method for rendering and displaying pixels for a triangular object to be displayed in an image, said triangular object having three edges and three vertices defined by X and Y coordinates, said method comprising
   (a) providing parameters defining said object,
   (b) organizing the pixels of said object in an array of non-overlapping blocks each of which contains fewer than all pixels in said image, said array of blocks comprising rows and columns of said blocks,
   (c) choosing a block in which pixels are to be rendered in a manner such that the first chosen block is a block in which one of said vertices lies and is positioned such that pixels of said object may be rendered by traversing, in successive repetitions, successive blocks of said array beginning at said first block and proceeding row by row in an order based on determining which blocks contain pixels within the object being rendered such that the traversal along each row is always in the same direction and the traversal from each row to the next row is always in the same direction,
   (d) generating, in parallel, pixel values for said chosen block based on said parameters,
   (e) repeating steps (c) and (d) until all pixels for the object have been rendered, and
   (f) displaying said rendered pixel values.

7. The method of claim 6 comprising traversing said array of blocks by
   (a) rendering pixels in said first block,
   (b) if the next block in the row after said first block includes a pixel contained in the triangle to be rendered, rendering pixels in that next block,
   (c) repeating step (b) until at least all blocks in the row that include a pixel contained in the triangle have been rendered,
   (d) rendering pixels in the block in the next row beginning with the first block in said row that includes a pixel contained in the triangle, and
   (e) repeating steps (b) through (d) until the entire triangle has been rendered.

8. The method of claim 7 further comprising storing, in step (a), the identity of the first block in the next row of blocks that includes a pixel contained in the triangle to be rendered for use in step (d).

9. The method of claim 7 further comprising
   determining whether a block includes a pixel contained in the triangle to be rendered by testing whether a pixel in an appropriate corner of said block is inside of the triangle.

10. A method for rendering and displaying pixels for a spherical object to be displayed in an image, said spherical object lying on a center defined by X and Y coordinates, said method comprising
    (a) providing parameters defining said object,
    (b) organizing the pixels of said object in an array of non-overlapping blocks each of which contains fewer than all pixels in said image, said array of blocks comprising rows and columns of said blocks,
    (c) choosing a block in which pixels are to be rendered in a manner such that the first chosen block is a block containing a pixel that lies on the circumference of said sphere and on a radius of said sphere which lies along the X or Y axis,
    (d) generating, in parallel, pixel values for said chosen block based on said parameters,
    (e) repeating steps (c) and (d) for successive blocks until all pixels for the object have been rendered, and, in successive repetitions, traversing successive blocks of the array in an order based on determining which blocks contain pixels within the object being rendered, and (f) displaying said rendered pixel values.

11. The method of claim 10 comprising traversing said array of blocks by
   (a) rendering pixels in said first block,
   (b) traversing blocks along a first row on either side of said first block until at least all blocks in the row that include a pixel contained in the sphere have been rendered, and
   (c) repeating step (b) in successive rows until the entire sphere has been rendered.

12. A method for rendering and displaying pixels for a line object to be displayed in an image, comprising
   (a) providing parameters defining said object,
   (b) organizing the pixels of said object in an array of non-overlapping blocks each of which contains fewer than all pixels in said image,
   (c) representing said line as two parallel edges,
   (d) selecting one of said blocks and generating, in parallel, pixel values for the pixels of said selected block based on said parameters,
   (e) repeating step (d) until all pixels for the line have been rendered, the repeating being performed by traversing said two parallel edges in successive rows of said blocks along the length of said line, and
   (f) displaying said rendered pixel values.

13. The method of claim 12 wherein said two parallel edges are one pixel apart.

14. Apparatus for rendering pixles for an object to be displayed as part of an image that includes a plurality of arrays of pixels, each of which is smaller than the complete array of pixels in the image to be displayed, the apparatus comprising
   an array of processors for rendering, in parallel, corresponding pixles in each said array of pixels, and
   a controller for directing the array of processors to work in sequence on a succession of said arrays of pixels that include pixels contained in the object to be rendered.

15. The apparatus of claim 14 wherein all processors in said array execute a common sequence of instructions.

16. The apparatus of claim 15 wherein said sequence of instructions includes instructions that mat be conditionally executed by a given processor.

17. Apparatus for rendering pixels for an object to be displayed as part of an image that includes a plurality of arrays of pixels, each of which is smaller than the complete array of pixels in the image to be displayed, the apparatus comprising
   an array of processors for rendering, in parallel, respective pixels in corresponding arrays of said pixels, said processors executing a sequence of instructions that includes routines that enable each processor to determine whether the pixel that it is assigned to render within an array of pixels is contained in the object to be rendered, and
   a controller for directing the array of processors to work in sequence on a succession of said arrays of pixels that include pixels contained in the object to be rendered.

18. Apparatus for rendering pixels for an object to be displayed as part of an image that includes a plurality of arrays of pixels, each of which is smaller than the complete array of pixels in the image to be displayed, the apparatus comprising
   an array of processors for rendering, in parallel, respective pixels in corresponding arrays of said pixels, said rendering being accomplished by calculating a value for each pixel based on a function that depends on the position of the pixel,
   one said processor, having a predetermined position in said array of processors, serves as a canonical processor assigned an initial value for said function, and each processor in said array calculates an initial value for its corresponding pixel based on the initial value for said canonical processor and on the position of said processor relative to said canonical processor, and
   a controller for directing the array of processors to work in sequence on a succession of said arrays of pixels that include pixels contained in the object to be rendered.

19. The apparatus of claim 18 further comprising microprogram instructions executable by each said processor and capable of multiplying a value by 0, 1, −1, or −2 and adding another number to the result, whereby the initial values for one processor may be calculated quickly.

20. The apparatus of claim 18 wherein said array is 4×4 and said canonical processor is located at position 1,1.

21. The apparatus of claim 18 wherein each processor comprises logical operations enabling the generation of a combined pixel write enable flag from several containment equations.

* * * * *

UNITED STATES PATENT AND TRADEMARK OFFICE
CERTIFICATE OF CORRECTION

PATENT NO. : 5,136,664
DATED : August 4, 1992
INVENTOR(S) : Bret B. Bersack et al.

It is certified that error appears in the above-indentified patent and that said Letters Patent is hereby corrected as shown below:

Column 11, line 59, replace "pixles" with --pixels--.

Column 13, line 39, replace "pixles" with --pixels--.

Column 14, line 42, insert --the-- after "for".

Signed and Sealed this

Fourth Day of January, 1994

Attest:

BRUCE LEHMAN

Attesting Officer     Commissioner of Patents and Trademarks